United States Patent [19]
Andrus et al.

[11] Patent Number: 6,130,178
[45] Date of Patent: Oct. 10, 2000

[54] STRONG MISERITE GLASS-CERAMICS

[75] Inventors: Ronald L. Andrus, Painted Post; George H. Beall, Big Flats; Linda R. Pinckney, Corning; Christine C. Wolcott, Horseheads, all of N.Y.

[73] Assignee: Corning Incorporated, Corning, N.Y.

[21] Appl. No.: 09/286,158

[22] Filed: Apr. 5, 1999

Related U.S. Application Data

[60] Provisional application No. 60/082,127, Apr. 16, 1998.

[51] Int. Cl.$^7$ ..................................................... C03C 10/16
[52] U.S. Cl. ........................ 501/3; 501/4; 501/5; 65/33.3
[58] Field of Search ......................... 501/3, 4, 5; 65/33.3

[56] References Cited

U.S. PATENT DOCUMENTS

| | | | |
|---|---|---|---|
| 2,920,971 | 1/1960 | Stookey | 106/39 |
| 3,839,001 | 10/1974 | Adams et al. | 65/33 |
| 4,386,162 | 5/1983 | Beall | 501/3 |
| 4,397,670 | 8/1983 | Beall | 65/33 |
| 4,464,475 | 8/1984 | Beall et al. | 501/9 |
| 4,467,039 | 8/1984 | Beall et al. | 501/3 |
| 4,971,932 | 11/1990 | Alpha et al. | 501/3 |
| 5,001,086 | 3/1991 | Carrier et al. | 501/9 |
| 5,336,642 | 8/1994 | Wolcott | 501/3 |

FOREIGN PATENT DOCUMENTS

| | | | |
|---|---|---|---|
| 0 076 692 | 6/1986 | European Pat. Off. | |

OTHER PUBLICATIONS

J. Douglas Scott, Crystal Structure of Miserite, A Zolatai Type 5 Structure Canadian Mineralogist, vol. 14, pp. 515–528 (1976).

George H. Beall, Chain Silicate Glass–Ceramics, Journal of Non–Crystalline Solids 129 (1991) pp. 163–173.

S. Likitvanichkul et al., Effect of Fluorine Content on Crystallization of Canasite Glass–Ceramics, Journal of Materials Science 30 (1995) pp. 6151–6155.

*Primary Examiner*—Karl Group
*Attorney, Agent, or Firm*—Anca C. Gheorghiu

[57] ABSTRACT

The present invention is directed at a glass-ceramic having high strength and toughness and containing miserite as a predominant crystal phase. The glass-ceramic has a composition calculated in terms of a weight percent on the oxide basis comprising 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, wherein R represents $Y^{3+}$ and rare earth metals in the lanthanide series, and 0–5% of optional constituents selected from the group consisting of MgO, SrO, BaO, $Na_2O$, $Nb_2O_5$, $ZrO_2$, and ZnO, and 0–10% of optional constituents selected from the group consisting of $Nb_2O_5$ and $TiO_2$ and 0–2% $Li_2O$ as an optional constituent. The glass-ceramic may contain secondary phases of cristobalite ($SiO_2$), fluorite ($CaF_2$), xonotlite ($Ca_6Si_6O_{17}F_2$), and fluorapatite ($Ca_5(PO_4)_3F$), and small amounts of other calcium silicate phases such as wollastonite ($CaSiO_3$).

24 Claims, 1 Drawing Sheet

STRONG MISERITE GLASS-CERAMICS

This application is a provision of Ser. No. 60/082,127 filed Apr. 16, 1998.

BACKGROUND OF THE INVENTION

1. Field of Invention

The present invention relates to strong glass-ceramics materials containing miserite crystals as the predominant crystalline phase.

2. Description of the Related Art

Glass-ceramics are polycrystalline materials formed by a controlled crystallization of a precursor glass article. A glass-ceramic may be prepared by exposing a glass monolith to a thermal treatment for conversion to a crystalline state. This is referred to as a "bulk or monolith forming process". Monolith glass-ceramic forming technology is founded in U.S. Pat. No. 2,920,971 (Stookey). In general, raw materials usually containing a nucleating agent are melted and simultaneously cooled to form a glass monolith of desired geometry. Thereafter the glass monolith is exposed to a crystallizing thermal treatment referred to as "ceramming". The appropriate thermal treatment typically includes a low temperature hold at a temperature somewhere above the transformation range to induce nucleation, followed by one or more higher temperature holds at temperatures somewhere above the softening point to promote crystal growth. In the monolith forming process nucleation transpires internally. The manufacture of glass-ceramics by bulk forming processes is compatible with high-speed, automated manufacturing processes employed in the formation of glass articles. Furthermore, internal nucleation can provide a wide range of potential crystalline microstructures.

U.S. Pat. Nos. 4,386,162 and 4,397,670 (Beall) discloses the preparation of glass-ceramic articles demonstrating high mechanical strength and toughness wherein crystals of canasite and/or agrellite and/or fedorite having a chain silicate structure constitute the predominant crystal phase. Those articles have a composition expressed in terms of weight percent on the oxide basis, comprising

| $SiO_2$ | 45–75 | $Na_2O$ | 3–15 | $B_2O_3$ | 0–6 |
|---|---|---|---|---|---|
| CaO | 8–30 | $K_2O$ | 0–20 | $Al_2O_3$ | 0–7 |
| F | 3.5–12 | $Na_2O + K_2O$ | 5–25 | $ZrO_2$ | 0–12. |

Compositions resulting in glass-ceramics exhibiting the greatest mechanical strength and toughness containing canasite as essentially the sole crystal phase have a composition expressed in terms of weight percent on the oxide basis, comprising

| $SiO_2$ | 50–65 | $Na_2O$ | 3–13 | $B_2O_3$ | 0–3 |
|---|---|---|---|---|---|
| CaO | 15–24 | $K_2O$ | 3–15 | $Al_2O_3$ | 0–3 |
| F | 5–9 | $Na_2O + K_2O$ | 11–22 | $ZrO_2$ | 0–8. |

Fluorite crystals ($CaF_2$) provide the nuclei upon which the canasite crystals [$Ca_5Na_4K_2(Si_{12}O_{30})F_4$] grow. Where canasite comprises essentially the sole crystal phase, there is an interlocking blade-like crystalline morphology, which structure has conferred modulus of rupture values to the crystallized articles in excess of 50,000 psi (345 MPa).

U.S. Pat. No. 4,467,039 (Beall et al.) discloses the formation of glass-ceramic articles exhibiting high strength and toughness containing potassium fluorrichterite ($KNaCaMg_5Si_8O_{22}F_2$) having a chain silicate structure as the predominant crystal phase.

The precursor glasses demonstrate the capability of cerramming very rapidly upon heat treatment and have a composition expressed in terms of weight percent on the oxide basis, comprising

| $SiO_2$ | 50–70 | F | 3–8 | $Li_2O$ | 0–3 |
|---|---|---|---|---|---|
| CaO | 4–15 | $Na_2O$ | 2–9 | $Al_2O_3$ | 0–7 |
| MgO | 8–25 | $K_2O$ | 2–12. | | |

Whereas the crystalline articles may also contain potassium-rich canasite ($K_3Na_3Ca_3Si_{12}O_{30}F_4$), the preferred products contain potassium fluorrichterite as essentially the sole crystal phase, and have a composition expressed in terms of weight percent on the oxide basis, comprising

| $SiO_2$ | 57–68 | $CaF_2$ | 7–12 | $K_2O$ | 3–7 |
|---|---|---|---|---|---|
| $Al_2O_3$ | 0–4 | $Na_2O$ | 2.5–5 | MgO | 14–18 |
| CaO | 0–3. | | | | |

A glass-ceramic may also be prepared by firing glass frits in what is referred to as powder processing methods. A glass is reduced to a powder state, formed to a desired shape, fired and crystallized to a glass-ceramic state. Instead of using internal nucleation, the relict surfaces of the glass grains serve as nucleating sites for the crystal phases. The glass composition, particle size, and processing conditions are chosen such that the glass softens prior to crystallization and undergoes viscous sintering to maximum density just before the crystallization process is completed. Shape forming methods may include but are not limited to extrusion, slip-casting, tape casting, spray drying and isostatic pressing.

Examples of powder processing glass-forming technology can be found in U.S. Pat. Nos. 3,839,001 (Adams et al.), 4,464,475 (Beall et al.), and 5,001,086 (Carrier et al.), herein incorporated by reference.

The manufacture of sintered glass-ceramics is compatible with glass-ceramic compositions for which no nucleating agents exist and is particularly suitable for the production of highly complex and intricately-shaped articles.

It is somewhat uncommon for any one glass-ceramic composition to be compatible with both the monolith and powder forming processes. Surface crystallization and poor internal nucleation in a monolith leads to very weak, deformed articles, while internal nucleation and poor surface crystallization in a powder compact may result in total crystallization prior to sintering, yielding at best a weak, porous, poorly sintered article and at worst a pile of crystallized powder.

It is an object of the present invention to provide a glass-ceramic composition compatible with both forming processes. It is another object of the present invention to provide a glass-ceramic having superior mechanical strength and fracture toughness.

SUMMARY OF THE INVENTION

The present invention resides in a single or multiple phase glass-ceramic material having a predominant crystal phase of the chain silicate miserite, a bending strength greater than 25,000 psi (175 MPa), a fracture toughness greater than 3.5 MPa√m, and a composition calculated in weight percent on an oxide basis comprising 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, where R represents $Y^{3+}$ and rare earth metals in the lanthanide series. Up to 5% of optional ingredients may be added from the group consisting of MgO, SrO, BaO, $Na_2O$, $Nb_2O_5$, $ZrO_2$ and ZnO and up to 10% from the group consisting of $Nb_2O_5$ and $TiO_2$. Additionally, 0–2% of $Li_2O$ as an optional ingredient may also be added.

The inventive glass-ceramic composition is compatible with both the monolith and powder forming processes.

DETAILED DESCRIPTION OF THE PREFERRED EMBODIMENTS

Figure 1:
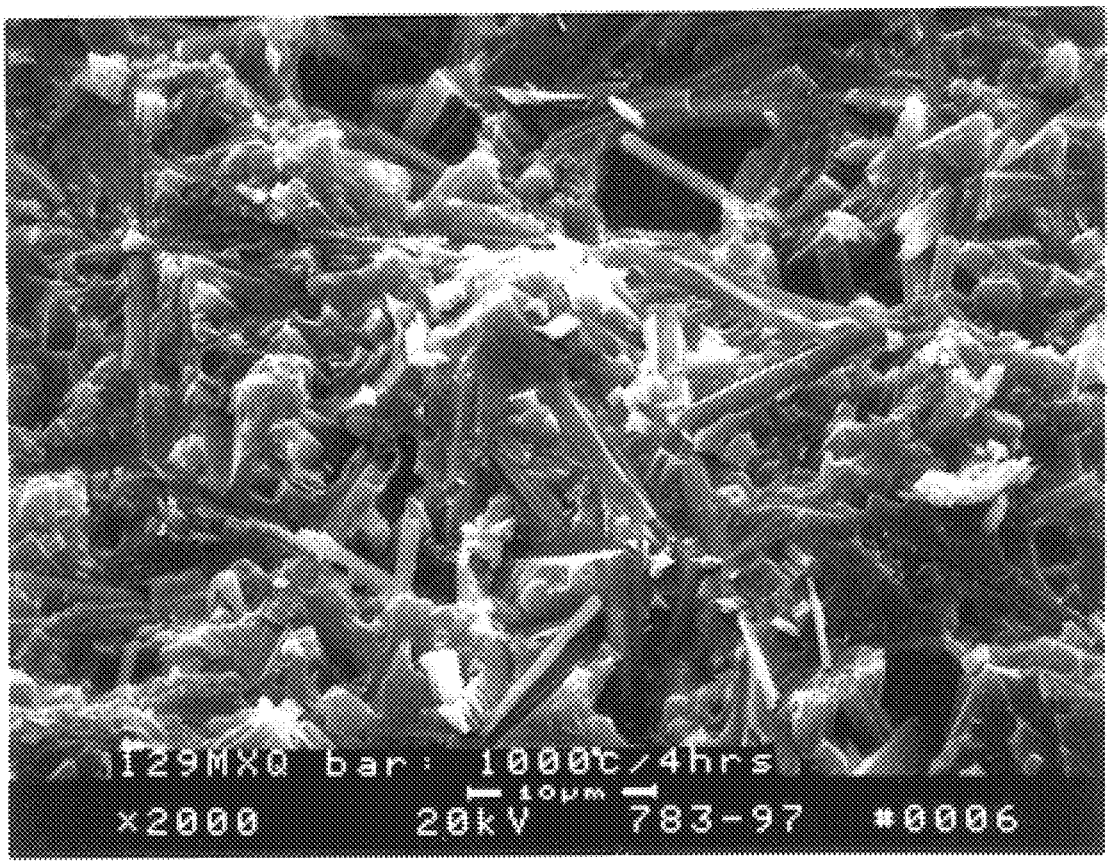
FIG. 1 is a photomicrograph showing the representative microstructure of the miserite glass-ceramic of the present invention.

The present invention is based on the discovery of a family of glass-ceramic compositions that can produce glasses of excellent stability which can be cerammed to produce strong glass-ceramics.

The inventive glass-ceramic is based on a composition comprising as expressed in weight percent on the oxide basis, 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, where R represents $Y^{3+}$ and rare earth metals in the lanthanide series. In addition the composition may comprise 0–5% of optional constituents selected from the group consisting of MgO, SrO, BaO, $Na_2O$, $Nb_2O_5$, $ZrO_2$, and ZnO, and 0–10% of optional constituents selected from the group consisting of $Nb_2O_5$ and $TiO_2$, and may also comprise 0–2% $Li_2O$ as another optional constituent.

X-ray diffraction analyses on the inventive-glass ceramics indicate a predominant crystal phase of miserite. Miserite is described and structurally analyzed by J. D. Scott in "Crystal Structure of Miserite, A Zoltai Type 5 Structure", *Canadian Mineralogist*, No. 14, 515–528 (1976).

The miserite mineral is a multiple chain silicate exhibiting an anisotropic, lath or rod-like crystal habit. Structurally, miserite crystals are composed of three-member subchains of $SiO_4$ tetrahedra which are linked to produced a closed quadruple $Si_{12}O_{30}$ chain composite, pipe-like in shape and parallel to the c-axis. The formula for miserite is $KCa_5\square$ $(Si_2O_7)(Si_6O_{15})(OH)F$, where $\square$ represents a vacant octahedral site in the crystal structure. This octahedral site is defined by slabs of Ca polyhedra and acts as a selective structural trap for minor atomic species which are present in the rocks in which the miserite mineral naturally occurs and provide the necessary charge balance in the formula. Examples of minor atomic species include $Ce^{4+}$ and $Y^{3+}$, $Nb^{5+}$, and other rare earth metals in the lanthanide series.

The most preferred composition range to obtain glass-ceramic materials exhibiting very high mechanical strength and fracture toughness, comprises in weight percent on the oxide basis 42–65% $SiO_2$, 12–25% CaO, 12–16% $CaF_2$, 5–9% $K_2O$, 0–2% $Al_2O_3$, 0–4% $B_2O_3$, 0–8% $P_2O_5$, 0–3% $R_2O_3$, where R represents $Y^{3+}$ and rare earth metals in the lanthanide series.

X-ray diffraction patterns of the inventive glass-ceramic reveal that the miserite crystal phase is often accompanied by crystals of cristobalite ($SiO_2$), fluorite ($CaF_2$), xonotlite ($Ca_6Si_6O_{17}F_2$), and fluorapatite ($Ca_5(PO_4)_3F$), and small amounts of other calcium silicate phases such as wollastonite ($CaSiO_3$). Cristobalite is particularly common in the powder processed glass-ceramic materials, as this crystal phase is easily surface nucleated. The inventive glass-ceramic materials are highly crystalline with less than 20% residual glass.

In the present invention, mixed miserite and fluorapatite glass-ceramic materials may be particularly useful as potential biomaterials. The secondary fluorapatite crystal phase may confer a degree of bioactivity to the inventive glass-ceramics, while at the same time the relatively simple chemistry of the glass-ceramic materials may be indicative of probable biocompatibility. Fluorapatite crystal growth is observed in the inventive glass-ceramics at levels of over 4 wt. % $P_2O_5$ in the bulk composition. The most preferred composition range to obtain a secondary fluorapatite crystal phase comprises in weight percent on the oxide basis, 40–55% $SiO_2$, 20–35% CaO, 10–15% $CaF_2$, 4–8% $K_2O$, 0–2% $Al_2O_3$, 0–3% $B_2O_3$, 4–15% $P_2O_5$. Up to 2 wt. % $Y_2O_3$ is allowed, but $CeO_2$ suppresses the crystallization of fluorapatite. Although potential biocompatibility has not been rigorously established in the inventive mixed miserite and apatite glass-ceramic materials, because of the apparent potential bioactivity from apatite crystals and potential biocompatibility from the materials' simple chemistry, these glass-ceramics may likely find application as bone implant materials.

Table I sets forth a number of glass compositions, expressed in terms of parts by weight on the oxide basis, illustrating the parameters of the present invention. Table I also presents test forming processes, crystal phases observed, modulus of rupture values as measured in Kpsi, and fracture toughness values as measured in $MPa\sqrt{m}$.

TABLE I

|  | MXO 1 | MXQ 2 | MXR 3 | MXV 4 |
|---|---|---|---|---|
| $SiO_2$ | 59.4 | 57.4 | 58.0 | 50.3 |
| $Al_2O_3$ | 0.6 | 0.6 | — | 0.2 |
| CaO | 18.0 | 18.0 | 18.0 | 29.7 |
| $CaF_2$ | 13.0 | 13.0 | 13.0 | 10.5 |
| $K_2O$ | 7.6 | 7.6 | 7.6 | 7.0 |
| $Y_2O_3$ | 1.4 | 1.4 | 1.4 | 1.3 |
| $B_2O_3$ | — | 2.0 | 2.0 | 1.0 |
| Process | Proc. A | Proc. A | Proc. A | Proc. A |
| Crystal Phases | miserite | miserite | miserite | miserite xonotlite |
| MOR (Kpsi) | 28.5 | 31.7 | 24.7 | 14.8 |

|  | MYB 5 | MYE 6 | MYG 7 | MYH 8 | MYI 9 |
|---|---|---|---|---|---|
| $SiO_2$ | 59.0 | 56.4 | 54.5 | 54.0 | 55.6 |
| $Al_2O_3$ | 0.6 | 0.6 | 0.6 | 0.6 | 0.6 |
| CaO | 18.0 | 18.0 | 19.6 | 19.6 | 19.6 |
| $CaF_2$ | 13.0 | 13.0 | 12.8 | 12.8 | 13.0 |
| $K_2O$ | 7.6 | 7.6 | 7.2 | 7.2 | 7.2 |
| $Y_2O_3$ | 0.8 | 1.4 | 1.3 | — | — |
| $B_2O_3$ | 1.0 | 1.0 | 1.9 | 1.9 | 1.9 |
| MgO | — | 2.0 | — | — | — |
| $P_2O_5$ | — | — | 2.1 | 2.1 | 2.1 |
| $CeO_2$ | — | — | — | 1.8 | — |
| Process | Proc. B | Proc. B | Proc. B | Proc. B | Proc. B |
| Crystal Phases | miserite | miserite xonotlite | miserite | miserite | miserite |
| MOR (Kpsi) | 24.8 | 25.7 | 28.5 | 33.6 | 28.3 |
| $K_{Ic}$ (MPa√m) | — | — | 3.6 | — | — |

TABLE I-continued

|  | MYJ 10 | MYK 11 | MYM 12 | MYR 13 | MYT 14 |
|---|---|---|---|---|---|
| $SiO_2$ | 51.7 | 48.8 | 45.9 | 52.2 | 51.1 |
| $Al_2O_3$ | 0.5 | 0.5 | 0.5 | 0.6 | 0.5 |
| CaO | 21.2 | 22.8 | 24.0 | 19.6 | 21.2 |
| $CaF_2$ | 12.5 | 12.3 | 12.0 | 12.8 | 12.5 |
| $K_2O$ | 6.8 | 6.5 | 6.1 | 9.5 | 6.8 |
| $Y_2O_3$ | 1.2 | 1.2 | 1.1 | — | — |
| $B_2O_3$ | 1.8 | 1.7 | 1.6 | 1.8 | 1.8 |
| $P_2O_5$ | 4.2 | 6.3 | 8.5 | 2.0 | 4.2 |
| $CeO_2$ | — | — | — | 1.5 | 1.5 |
| Process | Proc. B | Proc. B | Proc. B | Proc. A | Proc. A |
| Crystal Phases | miserite | miserite minor-apatite | miserite apatite | miserite xonotlite | miserite |
| MOR (Kpsi) | 30.1 | 25.8 | 16.0 | 30.1 | 31.5 |
| $K_{Ic}$ (MPa√m) | 36 | — | — | — |  |

|  | MYV 15 | MYW 16 | MYX 17 | MZA 18 | MZD 19 | MZG 20 |
|---|---|---|---|---|---|---|
| $SiO_2$ | 45.9 | 45.5 | 45.0 | 58.9 | 58.9 | 62.4 |
| $Al_2O_3$ | 0.5 | 0.5 | 2.0 | 0.6 | 0.6 | 0.6 |
| CaO | 24.0 | 23.5 | 23.5 | 19.0 | 19.0 | 15.0 |
| $CaF_2$ | 12.0 | 12.0 | 12.0 | 13.0 | 13.0 | 13.0 |
| $K_2O$ | 6.0 | 6.0 | 6.0 | 7.5 | 5.5 | 6.0 |
| $B_2O_3$ | 1.6 | 2.5 | 1.5 | — | 1.0 | — |
| $P_2O_5$ | 8.5 | 8.5 | 8.5 | 1.0 | 2.0 | 3.0 |
| $CeO_2$ | 1.5 | 1.5 | 1.5 | — | — | — |
| Process | Proc. A | Proc. A | Proc. A | Proc. A | Proc. A | Proc. A |
| Crystal Phases | miserite | miserite | miserite minor-apatite | miserite | miserite xonotlite | miserite |
| MOR (Kpsi) | 29.5 | 33.3 | 29.8 | 18.5 | 21.0 | 18.2 |
| $K_{Ic}$ (MPa√m) | — | — | — | 3.9 | — | 2.7 |

The exemplary glasses in Table I were powder processed in the following manner. The batch materials, which include but are not limited to standard oxides known to persons skilled in the art such as potassium carbonate and fluorspar (a source of $CaF_2$), were ballmilled together to secure a homogeneous melt, and subsequently deposited in lid-covered platinum crucibles. The filled crucibles were placed into a furnace and the glass batch was melted at temperature ranging from 1475–1500° C. for times ranging from about 4–6 hours. Thereafter a glass frit was prepared; the melt was simultaneously cooled and shaped, by passing the glass through water-cooled rollers to form thin sheets or ribbons, 1–2 mm thick; the ribbons were not annealed to facilitate the fragmentation of the glass; the glass fragments were ball-milled with alumina cylinders and methanol to a powder having an average particle size of about 10 microns. As used herein the term "glass frit" refers to a glass that has undergone pulverization. It is to be understood that the above described method for making glass frit is preferred, but other methods well known in the art are also suitable in the present invention.

Three gram samples of each glass powder composition were pressed at 10,000 psi into 0.5 inch diameter pellets. The glass powder pellets were introduced in a furnace and fired from 25° C. to 1000° C. at a rate of 500° C./hour with a hold at 1000° C. for four hours, during which the glass powder pellets underwent sintering and crystallization to a glass-ceramic state. After the firing cycle was complete, power to the furnace was turned off and the pellets were allowed to cool to room temperature at furnace rate.

The glass-ceramic pellets were submitted for X-ray diffraction analysis to determine the crystal phase(s) present in each specimen.

Specimens were also prepared for strength and toughness measurements in the following manner. A slurry was formed of 100 grams of the glass powders mixed with 8 grams of a 50% solution of "20M m.w." polyethylene glycol (Carbowax®) and approximately 40 grams of deionized water. The slurries were hand mixed and allowed to air dry, and thereafter hand passed through a 20 mesh screen (0.84 mm openings) to form granules for subsequent pressing into bars. Two processes were utilized in the formation of testing bars. In the first process (Proc.A), 8 grams of the granules were pressed one at a time under a pressure of 4,670 psi, using a Carver Model C laboratory press, into bars having approximate dimensions of 3.0"×0.5"×0.2". In the second process (Proc.B), 5.25 gram of the granules were pressed six at a time under a pressure of 10,400 psi, using a Dennison 39 ton hydraulic press, into bars having approximate dimensions of 2.5"×0.5"×0.15". Subsequently the bars were heated from 25° C. to 1000° C. at 300° C./hour with a hold at 1000° C. for 4 hours, and were cooled to room temperature at furnace rate, whereby the bars were sintered and crystallized to a glass-ceramic comprising a miserite primary crystal phase.

The glass-ceramic bars were sandblasted to produce consistent surface flaws in order to reduced the variability caused by specimen handling in subsequent abraded modulus of rupture (MOR) testing. MOR values in Table I indicate the highest value obtained in a group of 5 or 6 samples tested for each composition.

MOR or flexural strength is a measure of a material's ability to withstanding failure under a given load. High values of MOR are indicators of a strong material capable of withstanding high pressures before failure.

For fracture toughness ($K_{Ic}$) samples, 25 grams of glass powder were pressed into bars having approximate dimensions of 3.0"×0.5"×0.6" using Proc.A as described above. The same thermal treatment as per the strength specimens was also employed for the toughness specimens. From these sintered bars, $K_{Ic}$ samples were cut and finished with a fine grind to 0.565"×0.375"×0.325", all dimensions±0.001". Typically, three test specimens were obtained from each sintered bar.

$K_{Ic}$ is a measure of a material's intrinsic resistance to catastrophic crack propagation. High fracture toughness or $K_{Ic}$ values are desired. $K_{Ic}$ values for certain compositions are set forth in Table I and indicate the mean value based on three samples.

As can be observed from a study of Table I a MOR value of approximately 34,000 psi (235 MPa) was observed in Example 8. $K_{Ic}$ values of 3.6 MPa√m and 3.9 MPa√m were observed in Examples 7 and 10, and Example 18, respectively.

It is noted that all examples in Table I include an accessory cristobalite crystal phase. Internal nucleation is still the dominant force over surface nucleation even in the powder processed samples, nonetheless a strong, properly sintered glass-ceramic article was obtained.

In addition to isostatic pressing, other powder processes may be utilized in the production of the inventive glass-ceramic materials including but not limited to slip casting, tape casting, spray drying and extrusion.

In the present invention it has been observed that the operable glass compositions are also compatible with the monolith process for glass-ceramic formation. Therefore, the inventive glass-ceramic materials can be produced with customary monolith forming processes, as described in U.S. Pat. No. 2,920,971 (Stookey) and herein incorporated by reference. Raw materials are batched, melted into a glass, the glass cooled to a temperature at least below the transformation range, and a desired glass article shaped therefrom. The glass article is thereafter cerammed.

More specifically the method for monolith forming the inventive glass-ceramic article comprises four general steps:

(a) melting a batch for glass having a composition comprising in weight percent: 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, where R represents $Y^{3+}$ and rare earth metals in the lanthanide series, and 0–5% of optional constituents selected from the group consisting of MgO, SrO, BaO, $Na_2O$, $Nb_2O_5$, $ZrO_2$, and ZnO, 0–10% of optional constituents selected from the group consisting of $Nb_2O_5$ and $TiO_2$ and 0–2% $Li_2O$ as another optional constituent;

(b) cooling the glass to a temperature at least below the transformation range thereof and simultaneously forming a glass article therefrom of a desired configuration;

(c) exposing the glass article to a temperature between about 900–1000° C. for a period of time sufficient to cause development of the miserite crystals as the predominant crystal phase to form a glass-ceramic;

(d) cooling the glass-ceramic to room temperature.

Step (c) will customarily be divided in two stages. First the glass article will be exposed to a temperature within the range of about 600–800° C. for a period of time sufficient to generate the development of nuclei therein. The period of time will generally be about 2 hrs. Second, the nucleated glass will be exposed to a temperature within the range of about 900–1000° C. for a period of time sufficient to effect the growth of crystals on the nuclei. The period of time will generally be about 4 hrs. The inventive glass-ceramic material is internally nucleated with $CaF_2$.

Most often the resulting phase assemblage in the inventive glass-ceramic materials may be slightly different between the two forming processes. Nonetheless, the sequence of crystallization from fluorite to xonotlite to miserite is the same in both processes, and miserite is always the predominant crystal phase.

Table II reports a comparison between powder and monolith processing in crystal phase assemblage and MOR values in Examples 2, 5, 6 and 7.

TABLE II

| | MXQ 2 | MYB 5 | MYE 6 | MYG 7 |
|---|---|---|---|---|
| $SiO_2$ | 57.4 | 59.0 | 56.4 | 54.5 |
| $Al_2O_3$ | 0.6 | 0.6 | 0.6 | 0.6 |
| CaO | 18.0 | 18.0 | 18.0 | 19.6 |
| $CaF_2$ | 13.0 | 13.0 | 13.0 | 12.8 |
| $K_2O$ | 7.6 | 7.6 | 7.6 | 7.2 |
| $Y_2O_3$ | 1.4 | 0.8 | 1.4 | 1.3 |
| $B_2O_3$ | 2.0 | 1.0 | 2.0 | 1.9 |
| MgO | — | — | 2.0 | — |
| $P_2O_5$ | — | — | — | 2.1 |
| Powder Forming Process | Proc. A | Proc. B | Proc. B | Proc. B |
| MOR (Kpsi) | 31.7 | 24.8 | 25.7 | 28.5 |
| Crystal Phases | miserite minor-cristobalite | miserite minor-cristobalite | miserite xonotlite | miserite minor-cristobalite |
| Monolith Forming Process | 800° C.- 2 hrs 1000° C.- 4 hrs | 800° C.- 2 hrs 1000° C.- 4 hrs | 800° C.- 2 hrs 1000° C.- 4 hrs | 800° C.- 2 hrs 1000° C.- 4 hrs |

TABLE II-continued

| | MXQ 2 | MYB 5 | MYE 6 | MYG 7 |
|---|---|---|---|---|
| Crystal Phases | miserite minor-xonotlite fluorite | miserite | miserite | miserite |
| MOR (Kpsi) | 24.1 | 20.4 | 17.1 | 24.9 |

Monolith processed samples were prepared in the following manner. The glass compositions of examples 2, 5, 6, and 7 were melted to a glass, and thereafter poured into 0.5" thick patties and annealed at 600° C. Test pieces were sawcut to approximate dimensions of 2.5"×2.0"×0.5". The two-step thermal treatment included a nucleating step at 800° C. for 2 hours, followed by a 4 hour crystallization at 1000° C. The rate of heating was 300° C./hour. Cooling to room temperature was at furnace rate. The cerammed test samples were cut and fine ground into sample MOR bars having the dimensions of 2.0"×0.25"×0.13". The samples were sandblast abraded and MOR tested similarly to the aforementioned powder processed samples.

As can be observed from a study of Table II, cristobalite was not a secondary phase in the monolith processed samples. Furthermore, in all four examples, the powder processed samples had higher mechanical strengths than the monolith processed counterparts.

It should be recognized that although laboratory practice was employed, production of the inventive glass-ceramics can be transferred to commercial scale manufacturing.

Moreover, it should also be noted that various heat-treatment cycles may be used to produce unique microstructures tailored to provide different mechanical properties.

FIG. 1 is a scanning electron micrograph of the fracture surface of Example 3, wherein miserite comprises essentially the sole crystal phase present, taken at a magnification of 2000 times. The bar at the bottom of the micrograph represents a distance of 10 microns. The glass-ceramic was white-opaque in appearance. As can be observed in the micrograph the randomly-oriented, rod-like crystals represent the miserite crystal phase. The miserite crystals are about 10 microns in length and about 1 micron in diameter. The representative interlocking, rod-like crystal morphology is assumed to account for the high mechanical properties in the final product. It is believed that for a fracture to propagate through the resulting microstructure it has to follow a tortuous path around each miserite crystal, and therefore catastrophic failure is less likely to result.

Although the now preferred embodiments of the invention have been set forth, it will be apparent to those skilled in the art that various changes and modifications may be made thereto without departing from the spirit and scope of the invention as set forth in the following claims.

What is claimed is:

1. A glass-ceramic comprising miserite as a predominant crystal phase, the glass-ceramic having a composition comprising in weight percent: 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, wherein R represents $Y^{3+}$ and rare earth metals in the lanthanide series, and 0–5% of optional constituents selected from the group consisting of MgO, SrO, BaO, $Na_2O$, $Nb_2O_5$, $ZrO_2$, and ZnO, and 0–10% of optional constituents selected from the group consisting of $Nb_2O_5$ and $TiO_2$, and 0–2% $Li_2O$ as an optional constituent.

2. The glass-ceramic of claim 1, wherein the composition most preferably comprises in weight percent: 42–65% $SiO_2$, 12–25% CaO, 12–16% $CaF_2$, 5–9% $K_2O$, 0–2% $Al_2O_3$, 0–4% $B_2O_3$, 0–8% $P_2O_5$, 0–3% $R_2O_3$, where R represents $Y^{3+}$ and rare earth metals in the lanthanide series.

3. The glass-ceramic of claim 1, wherein the glass-ceramic has a modulus of rupture greater than 25,000 psi (175 MPa).

4. The glass-ceramic of claim 1, wherein the glass-ceramic has a modulus of rupture as high as 34,000 psi (235 MPa).

5. The glass-ceramic of claim 1, wherein the glass-ceramic has a fracture toughness greater than 3.5 MPa√m.

6. The glass-ceramic of claim 1, wherein the glass-ceramic has a cristobalite secondary crystal phase.

7. The glass-ceramic of claim 1, wherein the glass-ceramic has a xonotlite secondary crystal phase.

8. The glass-ceramic of claim 1, wherein the glass-ceramic has a fluorite secondary crystal phase.

9. The glass-ceramic of claim 1, wherein the glass-ceramic has a fluorapatite secondary crystal phase.

10. A glass-ceramic comprising a microstructure of randomly-oriented, interlocked miserite crystals.

11. The glass-ceramic of claim 10, wherein the miserite crystals have a length of about 10 microns and a diameter of about 1 micron.

12. The glass-ceramic of claim 10, wherein the miserite crystals have a rod-like crystal morphology.

13. A glass-ceramic comprising a miserite predominant crystal phase and a fluorapatite secondary crystal phase.

14. The glass-ceramic of claim 13, wherein the glass-ceramic is used as a biomaterial.

15. A method of producing a glass-ceramic having a predominant crystal phase of miserite, said method comprising:
   a) melting a glass having a composition, as calculated in weight % on an oxide basis, comprising 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, wherein R represents $Y^{3+}$ and rare earth metals in the lanthanide series, and 0–5% of optional constituents selected from the group consisting of MgO, SrO, BaO, $Na_2O$, $Nb_2O_5$, $ZrO_2$, and ZnO, and 0–10% of optional constituents selected from the group consisting of $Nb_2O_5$ and $TiO_2$, and 0–2% $Li_2O$ as an optional constituent;
   b) making a glass frit and shaping a glass article of desired configuration therefrom; and,
   c) exposing the glass article to a thermal treatment to produce a miserite crystal phase.

16. A method according to claim 15, wherein the melting step is carried out at a temperature ranging from 1475° C. to 1500° C. for a time ranging from 4 to 6 hours.

17. A method according to claim 15, wherein the thermal treatment is at a temperature of about 1000° C. for about 4 hours.

18. A glass ceramic according to the process of claim 15.

19. A method according to claim 15, wherein the glass article is shaped according to a method selected from the group consisting of extrusion, slip casting, isostatic pressing, tape casting and spray drying.

20. A method for producing a glass-ceramic article containing miserite as the predominant crystal phase comprising the steps of:
   a) melting a batch for a glass having a composition comprising in weight percent: 40–68% $SiO_2$, 12–35% CaO, 8–20% $CaF_2$, 4–10.5% $K_2O$, 0–5% $Al_2O_3$, 0–5% $B_2O_3$, 0–15% $P_2O_5$, 0–4% $R_2O_3$, wherein R represents $Y^{3+}$ and rare earth metals in the lanthanide series, and 0–5% of optional constituents selected from the group consisting of MgO, SrO, BaO, $Na_2O$, $Nb_2O_5$, $ZrO_2$, and ZnO, and 0–10% of optional constituents selected from the group consisting of $Nb_2O_5$ and $TiO_2$ and 0–2% $Li_2O$ as an optional constituent;
   b) cooling the glass to a temperature at least below the transformation range thereof and simultaneously forming a glass article therefrom of a desired configuration;
   c) exposing the glass article to a temperature between about 800–1000° C. for a period of time sufficient to cause development of miserite crystals as a predominant crystal phase to form a glass-ceramic; and,
   d) cooling the glass-ceramic to room temperature.

21. A method according to claim 20 wherein said glass body is initially exposed to a temperature in the range of about 600–800° C. for a period of time sufficient to develop a nucleated glass body, and thereafter the nucleated glass body is exposed to a temperature in the range of about 900–1000° C. for a period of time sufficient to cause the growth of crystals.

22. A method according to claim 21 wherein the period of time sufficient to develop the nucleated glass body is about 2 hours.

23. A method according to claim 21 wherein the period of time sufficient to grow crystals is about 4 hours.

24. A glass-ceramic formed according to the process of claim 20.

* * * * *